July 30, 1935.   F. C. MATTHAEI   2,009,963
AUTOMOBILE CHASSIS FRAME
Filed Aug. 11, 1933
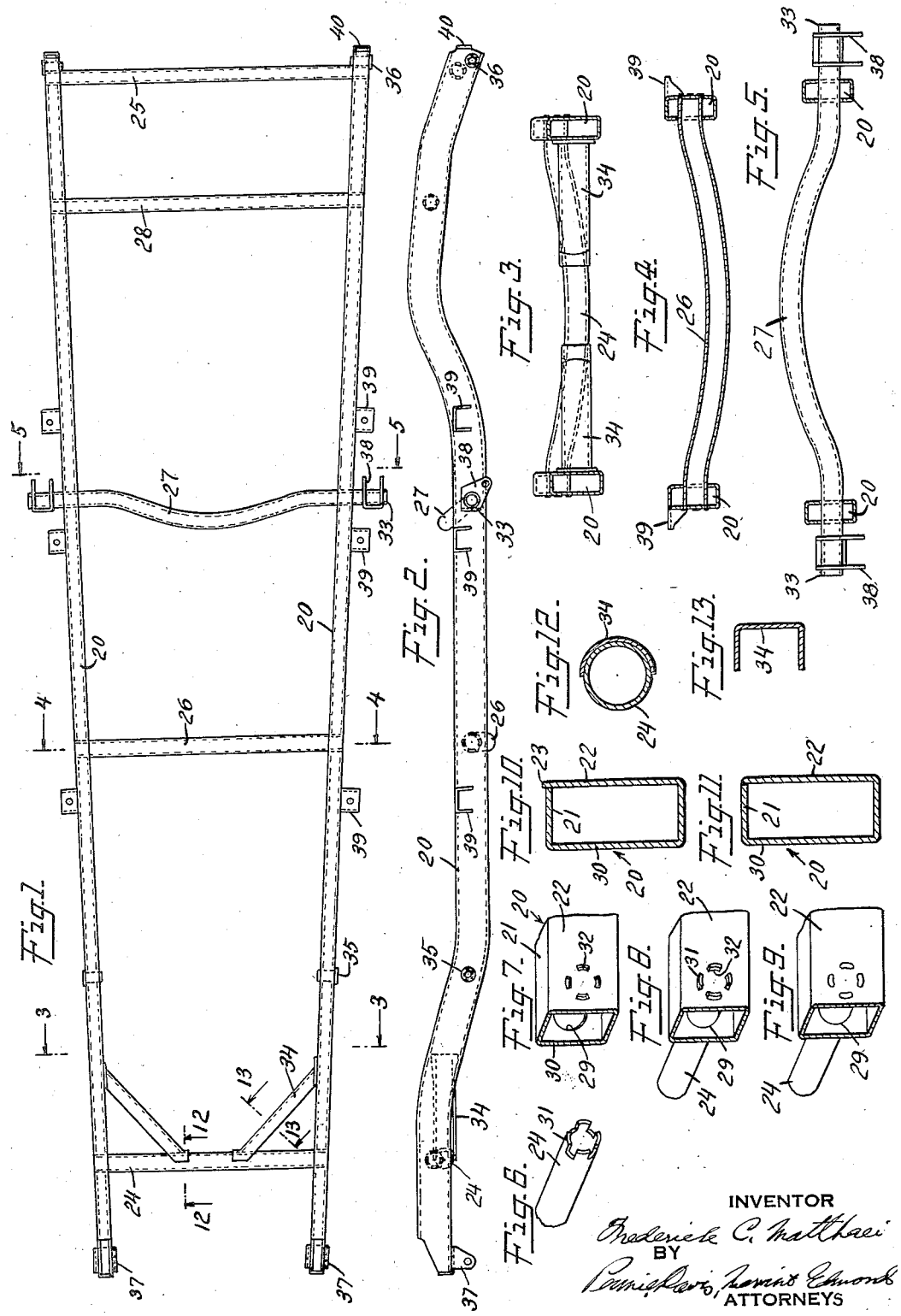
INVENTOR
Frederick C. Matthaei
BY
ATTORNEYS Patented July 30, 1935

2,009,963

UNITED STATES PATENT OFFICE 2,009,963

AUTOMOBILE CHASSIS FRAME

Frederick C. Matthaei, Detroit, Mich.

Application August 11, 1933, Serial No. 684,614

9 Claims. (Cl. 280—106)

This invention relates to frames for automobiles and has particular reference to the manufacture of a chassis frame which combines in a superior degree the primary requisites of strength to withstand all of the forms of stresses and strains to which such frames are subjected, together with light weight and low manufacturing cost.

In the manufacture of frames for automobiles, it has been the common practice to fabricate the frame from pressed steel shapes, usually including side members of channel section bent to the proper contour and connected in rigid spaced relation by cross-pieces, struts or bars welded or riveted in place. In order to secure the requisite rigidity and strength, the frame manufactured in accordance with prevailing methods has been made of metal parts which are disproportionately heavy by comparison with the relatively light parts used throughout the remainder of the vehicle, and the shaping of these relatively heavy parts has required large, heavy and expensive machinery, and also the process of manufacture has involved the production of a considerable amount of waste metal with consequent increased expense.

In accordance with the present invention, an automobile chassis frame is provided which may be of lighter weight and still possess the necessary strength and rigidity and which is less expensive to manufacture by comparison with frames made in accordance with the procedure heretofore common. The new frame is of special value for use in association with an automobile body of such construction that it serves as a reinforcement or stiffener for the frame and thus permits of the use of a frame of lighter weight than would otherwise be permissible; bodies in which the so-called streamline effect is more pronounced lend themselves particularly to such construction.

The new chassis frame of this invention embodying these advantages comprises two side-members and a plurality of cross-members, each formed from sheet-metal by rolling or forming it lengthwise to the shape of a hollow closed figure such as a rectangle or circle, the side-members being curved lengthwise as is required in automobile construction and each of them being made from a single piece of sheet metal which, when formed longitudinally into the desired cross-sectional shape, has its edges brought together to form a single longitudinal seam whose edges are welded together throughout the length of the member.

More particularly, each of the side-members of the new frame is made of a single metal strip which is rolled or formed longitudinally into a substantially rectangular tubular section. Preferably the section is oblong with rounded corners, the seam is formed at one of the corners, and one edge of the metal piece projects slightly beyond the other, with the result that the welding operation fuses the metal of this projecting edge down into the seam and effects an autogenous weld between the edges of the strip.

The development of the desired lengthwise curvatures in such a chassis frame side-member formed thus from a single sheet-metal strip and welded along the seam, presents a problem because it is essential that the tubular form of the frame member be preserved notwithstanding the stresses of the bending operation. Special bending machines are available whereby this lengthwise curvature may be developed in the side-member without collapsing it, or the tubular form of the side-member may be maintained by means of an articulated mandrel which is located within the member during the operation of subjecting it to pressure to bend it to the desired curvature, and which is specially constructed to permit of collapsing it to an extent sufficient to permit its withdrawal when the bending operation has been completed. This longitudinal bending to which I refer usually includes long radius arches over the front and rear axles of the car in which the frame is used.

As thus formed, the side-members possess great strength in proportion to the amount of metal used in them, this being due particularly to the tubular cross-section into which the sheet-metal piece of the member is developed and the fact that there is but a single lengthwise seam in the members which may be welded rapidly and at low cost to produce a wall of as great strength at the weld as elsewhere.

The cross-members of the frame are preferably in the form of tubes made by bending appropriate sheet-metal blanks to a circular cross-section and welding the resultant longitudinal seams.

The procedure incident to securing the ends of these cross-members to the side members is of great importance because strong joints at these points are so essential to the requisite strength and rigidity of the frame. These requisites are attained by providing openings in the inner and outer side walls of the side-members, inserting the end of the cross-member through these holes, and fastening the cross-member rigidly to the inner and outer side-walls of the side-members. For this purpose the inner and outer side-walls of the side-member may have round holes cut therethrough of a size corresponding closely to the exterior diameter of the tubular cross-member, and the end of the cross-member may be inserted through these holes and secured by an electric welding operation to both sidewalls of the side-member. Another procedure which may be employed involves the provision of a circular opening through the inner side wall of the side-member corresponding to the outer diameter of the cross-member and a circular series of openings in the outer side-wall, and also a corresponding series of projections upon the extreme end of the cross-member; the end of the cross-member is passed through the opening in the inner wall of the side-member, and the projections on the end of the cross-member are inserted through the corresponding openings in the outer wall of the side-member, whereupon the cross-member is secured to both walls of the side-member by welding operations which include upsetting the metal of the protruding projections upon the outer face of the side-member.

The side-members and cross-members of the frame are made from steel strip of the appropriate length and width. The strip for a side-member while still flat is pierced with certain of the openings therethrough required in the finished member, all of the size, shape and location required. However, those openings to be located in the portion of the side member which is to be subjected to lengthwise bending are not pierced at this time because they would be distorted in shape or their edges frayed in that bending operation. Then the strip or pierced blank is formed into a tube and this tube is then subjected to the lengthwise bending as above set forth to provide for arches over the front and rear axles. Then the remaining openings in the side walls of the side-member are formed by piercing or drilling, the side and cross-members are assembled and fastened to form the frame, and the several attachments of the frame are secured in place.

By this procedure a frame of great rigidity is produced, well adapted to withstand the strains to which it is subjected, and at the same time the desirable attributes of light weight and low cost are also attained.

For a more complete understanding of my invention, reference may be had to the accompanying drawing in which Fig. 1 is a plan view of the completed frame embodying the invention; Fig. 2 is a side view thereof; Figs. 3, 4, and 5 are cross-sections on lines 3—3, 4—4 and 5—5 of Fig. 1; Fig. 6 is a view of the end of one of the cross-members; Figs. 7, 8 and 9 are detail views illustrating one procedure which may be employed in uniting a cross-member to a side-member; Figs. 10 and 11 are cross-sectional views of a side-member illustrating the preferred procedure in forming them; and Figs. 12 and 13 are detail cross-sectional views on lines 12—12 and 13—13 of Fig. 1.

Referring to this drawing, Figs. 1 and 2 illustrate the general characteristics of the completed frame. The side-members 20 are preferably straight in plan but may be bent more or less out of a straight line as may be required by the design of the automobile on which the frame is to be used.

In elevation, these side members 20 are bent out of a straight line as is indicated in Fig. 2, and the details of the shape in this respect are determined by the design of the car. The bending usually includes an arch formation for clearing the rear axle, and also more or less of an arch at the forward end to extend over the front axle.

These side members 20 are of tubular section, and each is formed from a single strip of sheet-metal which is subjected to a rolling or pressing operation to bend it along longitudinal lines into the cross-sectional shape desired, such as that indicated in Fig. 10. Thus, a single seam is provided running lengthwise of each side-member 20, and this seam is preferably formed along the line of abutting contact of the top wall 21 with the outer side wall 22, the edge 23 of which projects slightly above the upper surface of the top wall 21, as is indicated in Fig. 10. These two abutting edges of the seam are then united by welding, preferably by electric welding, and in the process of welding the surplus metal of the projecting edge 23 is fused into the seam to seal it, as is indicated in Fig. 11, which shows the side-member after the weld has been made.

The bending of each side-member lengthwise, as for instance to give it the formation illustrated in Fig. 2, must be effected under conditions which guard adequately against collapse or distortion of the tubular section. This may be accomplished by the use of special bending machines or by the employment within the side-member of a collapsible, articulated mandrel whose articulated construction permits it to bend as required while performing its function of sustaining the walls of the side-member against collapse, and which may be partially collapsed thereafter to permit of withdrawing it from the interior of the side-member.

The two side-members 20 formed in this manner are rigidly connected together in properly spaced relation by a series of spaced cross-members including front cross-member 24, rear cross-member 25, and one or more intermediate cross-members such as are indicated at 26, 27 and 28. These cross-members are formed of blanks of sheet metal rolled into tubular section, and the resulting longitudinal seam is welded. They may be bowed forwardly and upwardly as in the case of member 27, or downwardly as in the case of member 26, depending upon structural requirements of the automobile.

One procedure which may be used in making joints of the requisite strength between the cross-members and the side-members is illustrated in detail in Figs. 6, 7, 8 and 9. This procedure is preferably followed in connection with the cross-members 24, 25, 26 and 28. This joint is formed by inserting the ends of the cross-member through circular holes 29 formed in the inner side walls 30 of the side-members 20 (Fig. 7) and securing the extreme ends of the cross-member to the corresponding outer side walls of the side-members 20. The holes 29 are approximately the same diameter as the outer diameter of the cross-members so that the latter will fit closely therein.

The ends of the cross-members 24, 25, 26 and 28 are serrated to provide spaced projections 31, the axial length of which is slightly greater than the thickness of the outer side wall 32. Corresponding slots 32 are punched or otherwise formed in circular series in the outer side wall 22 of the side-member 20 in alignment with the corresponding hole 29 in the inner side wall.

With the end of the cross-member passed through the hole 29 in the inner side wall, the projections 31 are inserted in the corresponding slots in the outer side wall with their ends protruding beyond the outer surface of the wall, as is illustrated in Fig. 8. These protruding ends are then anchored in place, preferably by being fused with an electric arc to melt them down into welding contact with the outer wall 22 of the side-member 20, as illustrated in Fig. 9. The cross-member is also secured to the inner walls 30 of the side-members, preferably by electric welding.

As to cross-member 27, it may be desirable to extend the ends of this cross-member through both side-members 20 and utilize the ends of the cross-member 27 for the support of the other parts. It may be secured to both side-walls of both of the side-members 20 by welding and channel-shaped rear spring brackets 38 may be secured to the ends thereof.

The front cross-member 24 may also be connected by diagonal braces 34 (Figs. 1 and 2) to the inner walls 30 of side-members 20, the inner ends of these braces 34 being shaped to conform to the curvature of the front cross-member 24 as is illustrated in Fig. 12, while the outer ends are made flat to conform to the flat surfaces presented by the side-members 20. The braces 34 are channel shape in cross-section as is illustrated in Fig. 13, and their ends are welded to the cross-members 24 and to the side-members 20.

Other parts illustrated in the drawing include spring-hanger bushings 35 and 36, front spring-brackets 37, body brackets 39, and rear bumper plates 40. Suitable openings for use in mounting certain of these parts in position may be formed in the sheet metal strips from which the side-members are made coincident with forming certain of the openings for the ends of the cross-members and prior to bending the strip to its tubular form. However, as above pointed out, all of the openings required in the walls of the side-members cannot ordinarily be pierced in the strips from which the members are formed prior to bending the strips to their tubular form. Openings occurring in the portions of the side-members which are subjected to bending to arch over the axles would, if formed in the flat blanks for the side-members, be distorted out of shape in the bending operation or their edges would be fractured. These openings are, therefore, formed after the side-member has been completely formed either by piercing or by drilling.

The construction illustrated and above described is that which I prefer to employ, but it is to be understood that the invention is not limited to this particular embodiment as structural changes and changes in the procedure described may be made while still retaining the novel features of the invention.

I claim:

1. An automobile chassis frame comprising the combination of two side-members each formed from a single piece of sheet metal which is bent along lines extending longitudinally thereof to a tubular cross-section presenting a single lengthwise seam and having the seam edges welded together, and a plurality of cross-members connecting the side-members and each having each of its ends extending through openings in the inner and outer side walls of a side-member and secured to both of said side walls.

2. An automobile chassis frame comprising the combination of two side-members each formed from a single piece of sheet metal which is bent along lines extending longitudinally thereof to a rectangular tubular cross-section presenting a single lengthwise seam at one of the corners of the rectangle and having the seam edges welded together, and a plurality of cross-members connecting the side-members and each having each of its ends extending through openings in the inner and outer side walls of a side-member and secured to both of said walls.

3. An automobile chassis frame comprising the combination of two side-members each formed from a single piece of sheet metal which is bent along lines extending longitudinally thereof to a tubular cross-section presenting a single lengthwise seam and having the seam edges welded together and each of said side-members being curved in the direction of its length, and a plurality of cross-members connecting the side-members and having each of its ends extending through openings in the inner and outer side walls of a side-member and secured to both of said side walls.

4. An automobile chassis frame comprising the combination of two side-members each formed from a sheet metal piece which is bent along lines extending longitudinally thereof to a rectangular tubular cross-section presenting a single lengthwise seam at one of the corners of the rectangle and having the seam edges welded together, each of said side members being curved in the direction of its length, and a plurality of cross-members connecting the side members and each having each of its ends extending through openings in the inner and outer side walls of a side-member and secured to both of said walls.

5. An automobile chassis frame comprising the combination of two side-members each formed from a single piece of sheet metal which is bent along lines extending longitudinally thereof to a rectangular tubular cross-section presenting a single lengthwise seam which is located at a corner of the rectangle formed by the meeting edges of adjacent sides and having the seam edges welded together whereby the tubular members are free of protruding portions, each of said side members being curved in the direction of its length, and a plurality of cross-members connecting the side-members together in spaced relation and each having each of its ends secured to a side member.

6. An automobile chassis frame comprising the combination of two side-members each formed from a single piece of sheet metal which is bent along lines extending longitudinally thereof to a rectangular tubular cross-section presenting a single lengthwise seam at one of the corners of the rectangle and having the seam edges welded together, and a plurality of tubular cross-members connecting the side-members together, each of said cross-members having each of its ends extending through an opening of corresponding shape in the inner side wall of a side-member and having a series of integral projections upon its extreme end passing through a series of openings of corresponding shape in the outer side wall of that side member and secured to that outer side wall.

7. An automobile chassis frame comprising the combination of two side-members each formed from a single piece of sheet metal which is bent along lines extending longitudinally thereof to a rectangular tubular cross-section presenting a single lengthwise seam and having the seam edges welded together, each of said side-members being curved in the direction of its length, and a plurality of cross-members connecting the side-members together in spaced relation and each having each of its ends passing through a closely fitting open in the inner wall of a side-member and passing through an opening in the outer wall of the side-member and secured to said outer wall.

8. An automobile chassis frame comprising the combination of two side-members each formed from a single piece of sheet metal which is bent along lines extending longitudinally thereof to a rectangular tubular cross-section presenting a single lengthwise seam which is located at the corner of the rectangle and having the seam edges welded together, each of said side-members being curved in the direction of its length, and a plurality of cross-members connecting the side-members together in spaced relation and each having each of its ends extending through a closely fitting opening in the inner wall of a side-member and extending through an opening in the outer side-wall of that side-member and welded to that outer side wall.

9. In an automobile chassis frame comprising the combination of two side members each formed from a single piece of sheet metal which is bent along lengthwise lines so that the metal of the piece from one lateral edge to the other forms the four sides of a rectangular tubular member presenting a single lengthwise seam and having the seam edges welded together, each of said side members being curved in the direction of its length, and a plurality of cross-members connecting the side members together in spaced relation and each having each of its ends secured to a side member.

FREDERICK C. MATTHAEI.